(12) United States Patent
Chihara

(10) Patent No.: US 6,585,868 B1
(45) Date of Patent: Jul. 1, 2003

(54) REDUCED WATER PRODUCING APPARATUS

(75) Inventor: Yasutaka Chihara, Maizuru (JP)

(73) Assignee: Japan Matex Kabushiki Kaisha, Osaka (JP)

( * ) Notice: Subject to any disclaimer, the term of this patent is extended or adjusted under 35 U.S.C. 154(b) by 0 days.

(21) Appl. No.: 09/727,375

(22) Filed: Nov. 28, 2000

(30) Foreign Application Priority Data

Aug. 8, 2000 (JP) ........................................ 2000-239456

(51) Int. Cl.[7] .............................. C25B 9/00; C25B 11/00
(52) U.S. Cl. ................................. 204/229.5; 204/284
(58) Field of Search ......................... 204/229.5, 230.6, 204/284, 292, DIG. 9

(56) References Cited

U.S. PATENT DOCUMENTS

| | | | |
|---|---|---|---|
| 4,077,863 A | * | 3/1978 | Nasser ........................ 204/256 |
| 5,376,242 A | * | 12/1994 | Hayakawa ............... 204/229.5 |
| 5,435,894 A | * | 7/1995 | Hayakawa ................... 204/222 |

FOREIGN PATENT DOCUMENTS

JP         2000-263050     *   9/2000

* cited by examiner

Primary Examiner—Nam Nguyen
Assistant Examiner—Thomas H. Parsons
(74) Attorney, Agent, or Firm—Curtis L. Harrington

(57) ABSTRACT

This invention relates to a reduced water producing apparatus, which can mass-produce reduced water, wherein oxidation-reduction potential maintains for a long period successively, from not only industrial water, natural water but pure water speedily and inexpensively, and that suited for industrial mass production of reduced water. The apparatus have a water tank, at least one electrode plate unit, and a voltage impressing means for impressing high-frequency alternating voltage, wherein the electrode plate unit includes two alternating electrode plates in which alternating voltages impressed by the voltage impressing means are varied to be modulated waves of mutually opposite phases and a ground electrode plate arranged to oppose the two alternating electrode plates, and wherein surfaces of these electrode plates are formed of titanium or platinum.

8 Claims, 5 Drawing Sheets

REDUCED WATER PRODUCING APPARATUS

BACKGROUND OF THE INVENTION

1. Field of the Invention

This invention relates to a reduced water producing apparatus, and its object is to provide an apparatus which can mass-produce reduced water of good quality, wherein an oxidation-reduction potential is maintained for a long period successively, from not only industrial water or natural water but pure water speedily and inexpensively, and that suited for industrial mass production of reduced water.

2. Background Art

A pipeline used for a heater, a boiler, a tube, a feed pipe, a general service water pipe and so on has some problems such as obstructing circulation in the pipeline or a drop in thermal efficiency because scale accumulates inside after many years use.

In the past, when the scale stuck on the pipeline was removed, a chemical cleaning treatment or a removal using physical pressure by high pressured water had been undertaken; however, using the chemical cleaning treatment may cause corrosion on the pipeline, meanwhile, a method by the high pressured water is difficult to remove scale stuck on a capillary or a strainer, etc.

As the above circumstances, in recent years, a method of removing scale stuck inside of the pipeline by a circulation of reduced water through the pipeline is contrived.

Reduced water, is meant alkaline water which is treated to a negative oxidation-reduction potential, and water molecule cluster is smaller than pure water, consequently, having superior osmotic strength, and enables scale attached within the pipeline to be removed by the use of osmotic action.

Conventional methods of producing water with a reduced oxidation potential are known and include reduction of oxygen concentration in water by addition of hydrazine, and also by bubbling nitrogen gas or hydrogen gas through the water to allow the oxidation reduction potential to be lowered.

The above conventional producing methods, however, are not a method that can produced a large volume of reduced water economically, therefore, it is inappropriate to use for industry thereof, moreover, reduced water which produced thereby can not maintain negative oxidation-reduction potential for a long period, either.

In addition, a known method for electrolyzing water to reduce the oxidation ipotental is available. There is an apparatus used for said method which have a high frequency alternating power source and either flat or column electrodes, wherein reduced treatment of water is undertaken by impressing of a sine wave voltage to the electrodes from the alternating power source.

However, it is difficult for the conventional reduced water producing apparatus as above to reduce pure water since the apparatus is principally designed for reducing treatments of city water or industrial water as a material. Moreover, a oxidation-reduction potential of the produced reduced water is no more than −400 to −450 mV, so that negative oxidation-reduction potential can not be maintained for a long period. Furthermore, an efficiency of the producing reduced water is not so high, and such apparatus is not suited for industrial mass production of reduced oxidation potential water.

A object of the invention is to provide the apparatus which can mass-produce reduced water, wherein oxidation-reduction potential maintains for a long period successively, from not only industrial water, city water, natural water and so on but pure water speedily and inexpensively, and that suited for industrial mass production of reduced water.

BRIEF SUMMARY OF THE INVENTION

The invention relates to the reduced water producing apparatus, wherein at least one electrode plate unit is arranged within the water tank, and a voltage impressing device for impressing high-frequency alternating voltage to electrode plates comprising the electrode plate unit, wherein the electrode plate unit includes two alternating electrode plates in which alternating voltages impressed by the voltage impressing device are varied to be modulated waves of mutually opposite phases and a ground electrode plate arranged to oppose the two alternating electrode plates, and wherein surfaces of these electrode plates are formed of titanium or platinum.

The invention also relates to the reduced water producing apparatus wherein each of said electrode plates is formed of a mesh portion and a frame portion formed on a periphery of the mesh portion, the mesh portion being formed of platinum or platinum plated titanium, and the frame portion being formed of titanium.

The invention also relates to the reduced water producing apparatus wherein said mesh portion is a mesh portion comprised of continuously formed meshes of rhomboidal or hexagonal shape.

The invention also relates to the reduced water producing apparatus wherein the electrode plate unit is snap-bent to substantially a letter V-like.

The invention also relates to the reduced water producing apparatus, wherein the electrode plate unit is snap-bent to substantially a letter V-like.

The invention also relates to the reduced water producing apparatus, wherein the electrode plate unit is snap-bent to substantially a letter V-like.

The invention also relates to the reduced water producing apparatus wherein a frequency of alternating voltage impressed by the voltage impressing means is in a range of 30 to 60±5 to 10 kHz.

The invention also relates to the reduced water producing apparatus wherein a frequency of alternating voltage impressed by the voltage impressing means is in a range of 30 to 60±5 to 10 kHz.

The invention also relates to the reduced water producing apparatus wherein a frequency of alternating voltage impressed by the voltage impressing means is in a range of 30 to 60±5 to 10 kHz.

The invention also relates to the reduced water producing apparatus wherein a frequency of alternating voltage impressed by the voltage impressing means is in a range of 30 to 60±5 to 10 kHz.

The invention also relates to the reduced water producing apparatus wherein the water tank is comprised of a pressure-resistant vessel of circular section shape that-can be sealed hermetically on condition that the electrode plate unit is accommodated therein.

The invention also relates to the reduced water producing apparatus wherein the water tank is comprised of a pressure-resistant vessel of circular section shape that can be sealed hermetically on condition that the electrode plate unit is accommodated therein.

The invention also relates to the reduced water producing apparatus wherein the water tank is comprised of a pressure-resistant vessel of circular section shape that can be sealed hermetically on condition that the electrode plate unit is accommodated therein.

The invention also relates to the reduced water producing apparatus, wherein the water tank is comprised of a pressure-resistant vessel of circular section shape that can be sealed hermetically on condition that the electrode plate unit is accommodated therein.

DETAILED DESCRIPTION OF PREFERRED EMBODIMENTS

The reduced water producing apparatus in a preferred embodiment of the present invention will be explained with a reference made to the drawings.

Figure 1:
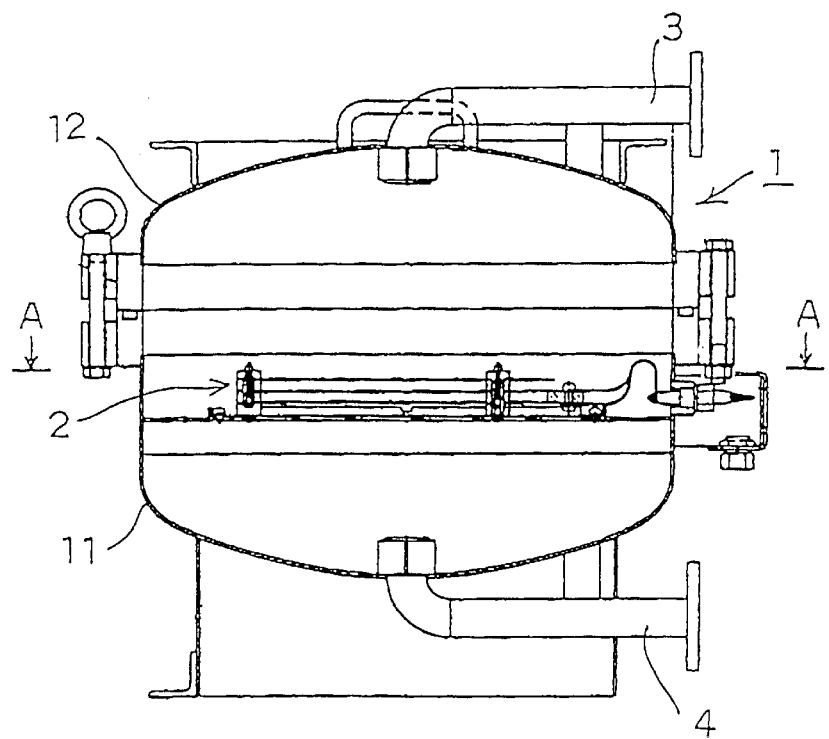
FIG. 1 is a partially sectional front view of the reduced water producing apparatus related to the invention.
Figure 2:
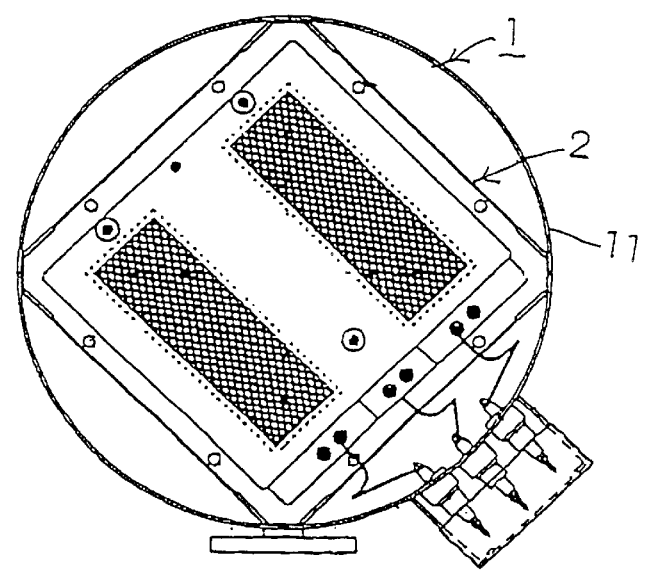
FIG. 2 is a cross section view along line A—A of FIG. 1.

FIG. 1 is a partially sectional front view of the reduced water producing apparatus related to the invention. FIG. 2 is a cross section view along line A—A of FIG. 1;

The reduced water producing apparatus of the present invention is comprised of the water tank (1) that contains reduced water inside thereof, at least one electrode plate unit (2) that is arranged within the water tank (1), and the voltage impressing means (not shown in figure) that impresses high-frequency alternating voltage to the electrode plates comprising the electrode plate unit (2).

The water tank (1) is comprised of a pressure-resistant vessel which can stand both positive and negative pressure and can be sealed hermetically on condition that a electrode plate unit is accommodated therein, both a vessel portion (11) and a lid portion (12) are separable to top and bottom and are integrated, outlet pipe (3) is disposed on the upside of the lid portion (12), and a inlet pipe (4) is disposed on the bottom of the vessel portion (11).

For a material of the water tank (1), a stainless steel such as SUS 304 or SUS 316, is preferably used, but a synthetic resin may be used. However, if the synthetic resin is used, it is possible to influence the operation to produce reduced water by allowing oxygen to permeate in air, so that some countermeasures are needed, for example, when an acrylic resin is used, its thickness should be more than 10 mm.

Further, a shape of the water tank (1) is not particularly defined, even though such as a quadrangular section shape is also possible, a circular section shape as shown is preferably used since the shape is superior on pressure. Moreover; numbers of the water tank (1) is not limited, plural numbers of the water tank (1) may be arranged as water can flow through therein.

Furthermore, a water tank (1) may be a open-top shape without the lid portion (12), but in this case, an open face of the water tank has to be shut by using of inert gas such as nitrogen or argon, in orderta oxygen in air does not cause a reduced water production.

Figure 3:
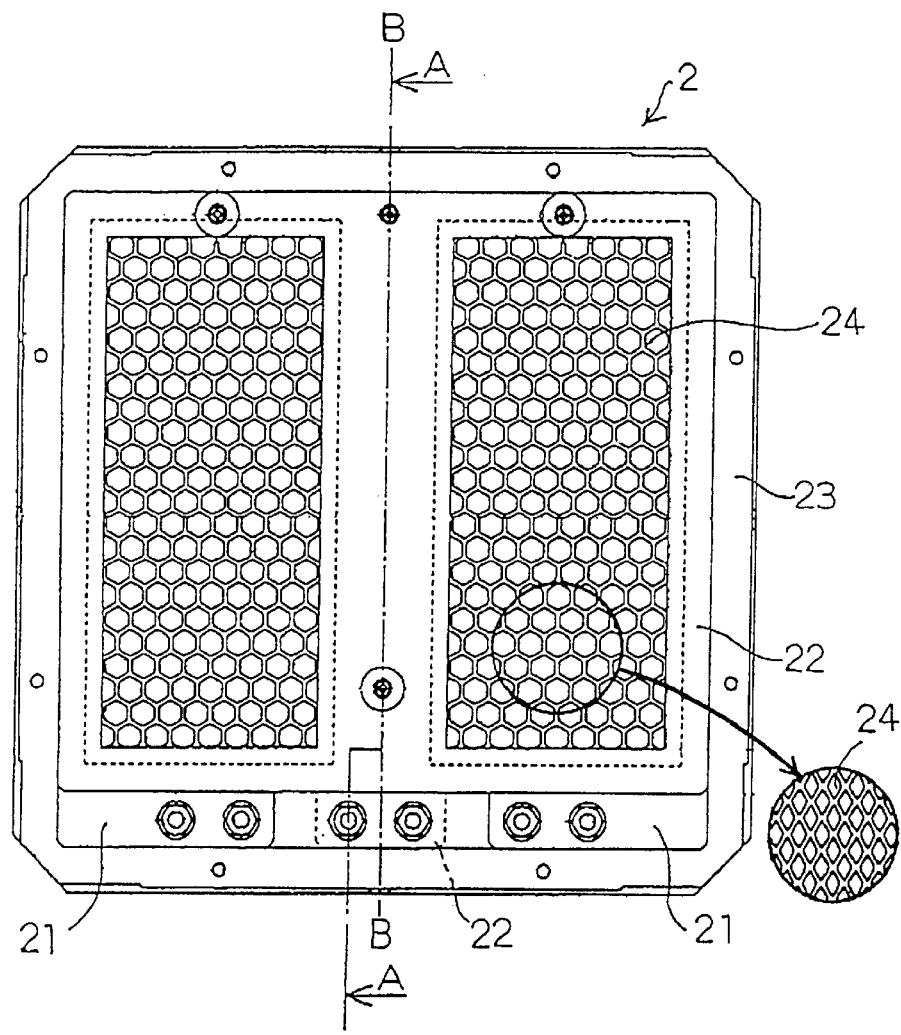
FIG. 3 is a plane view of the electrode plate unit.
Figure 4:
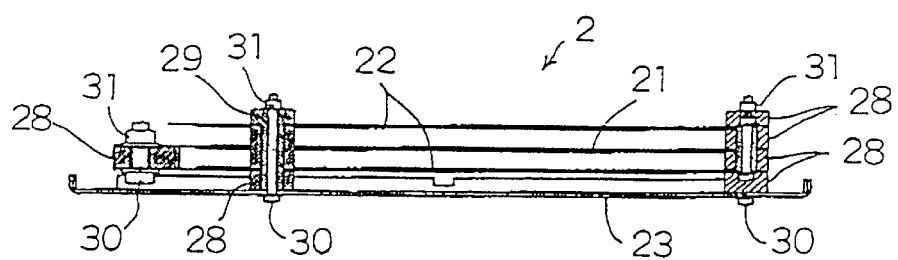
FIG. 4 is a cross section view along line A—A of FIG. 3.

FIG. 3 is a plane view of the electrode plate unit (2), and FIG. 4 is a cross section view along line A—A of FIG. 3.

Figure 7:
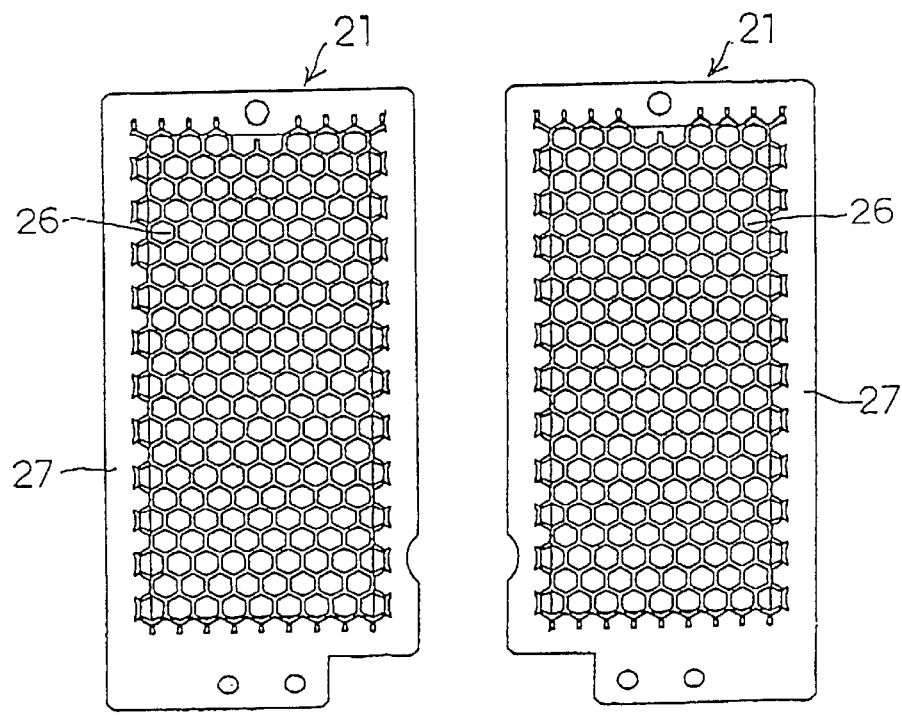
FIG. 7 is a plane view of the alternating electrode plate.

The electrode plate unit (2) is comprised of the two alternating electrode plates (21) (see FIG. 7) whereof high-frequency alternating voltage is impressed by the voltage impressing means, the two ground electrode plates (22) that are arranged oppositely at opposing up and down positions as alternating electrode plates (21), the electrode assemble base plate (23) that is arranged at the lowest position of the electrode plate unit (2) and operates as a base plate and enables the above four electrode plates to be integrated, and a fixation means whereby the alternating electrode plates (21) and the ground electrode plates (22) are assembled in one piece and fixed.

Figure 5:
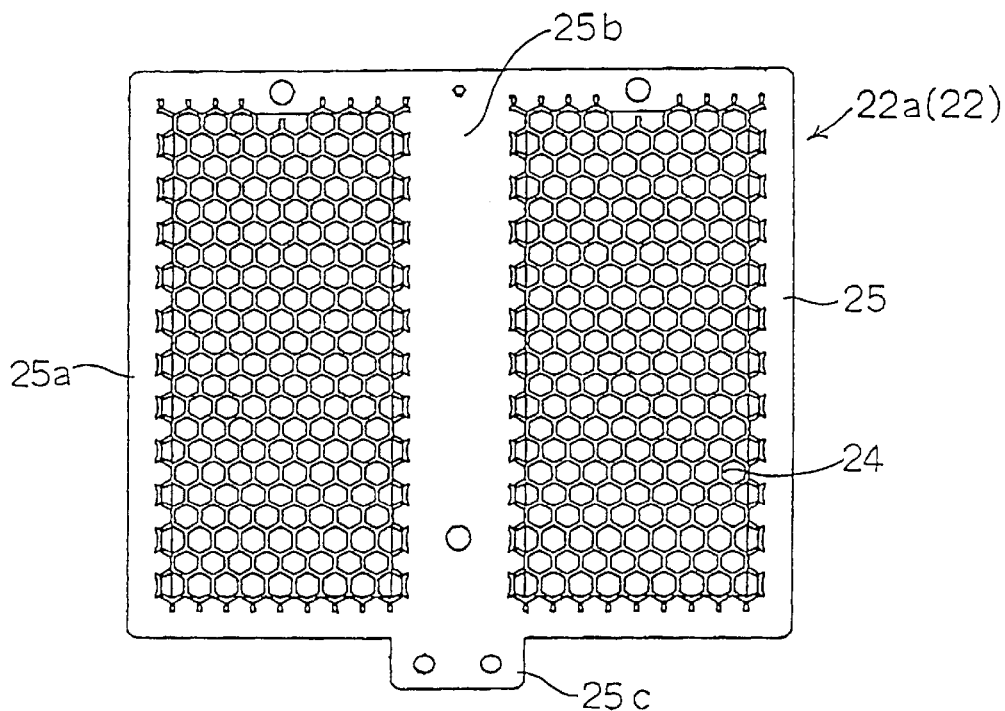
FIG. 5 is a plane view of the ground electrode plate.
Figure 6:
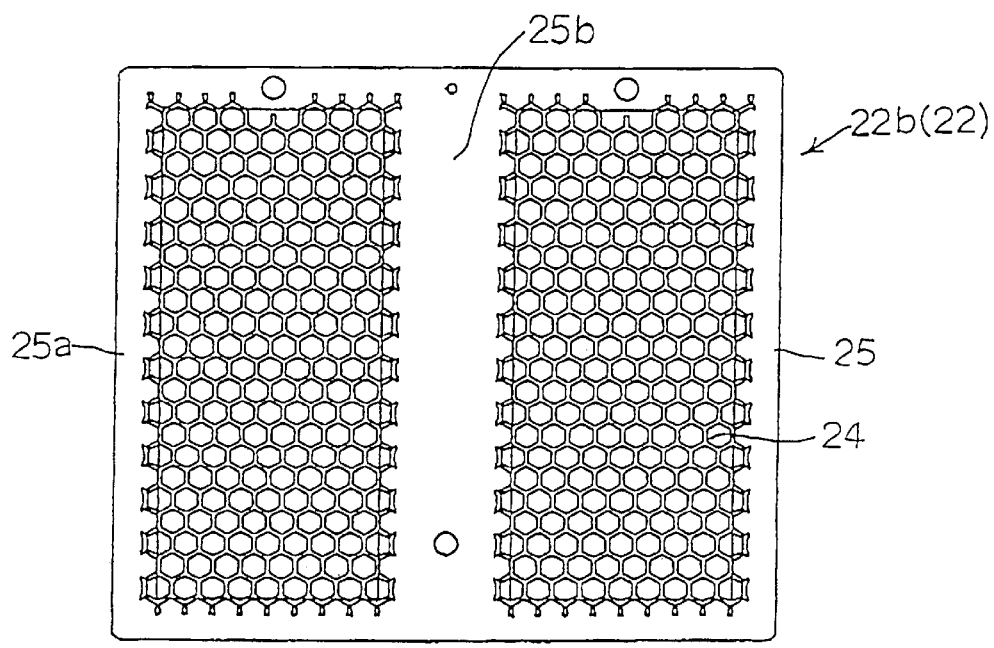
FIG. 6 is a plane view of the ground electrode plate.

FIG. 5 and FIG. 6 are plane views of the ground electrode plate (22).

The first ground electrode plate (22a) shown as FIG. 5 is the electrode plate arranged between the alternating electrode plates (21) and the electrode assemble base plate (23), and the second ground electrode plate (22b) shown as FIG. 6 is the electrode plate arranged at the highest position of the electrode plate unit (2).

These ground electrode plates (22) are formed a mesh portion (24) and a frame portion (25) formed on a periphery of the mesh portion (24). Also, material of the mesh portion (24) is either platinum or platinum plated titanium (plated thickness is more than 3 $\mu$m), and material of the frame portion (25) is titanium.

The frame portion (25) is formed as a quadrangular periphery frame portion (25a) and a connecting frame portion (25b) connecting both centers of the side of opposite disposed two periphery frames (25a) and the plane viewing is like a letter H, wherein each of mesh plates having the mesh portion (24) are fixed by spot-welding to rectangular formed two space portions.

In addition, on the frame portion (25), several penetrate holes are formed in order to let through bolts for fixation means.

Also, on the first ground electrode plate (22a), a outward projecting portion (25c) is formed like as an extension of the connecting frame portion (25b) of the frame portion (25), whereof two penetrate holes are disposed for letting through bolts on the outward projecting portion (25c), and that is the only difference to the second ground electrode plate (22b).

Although the mesh portion (24) is shown as a hexagonal shaped mesh of consistent size as an illustrative example, meshes of rhomboidal shape as shown as the shape of a drawn out circle, seen in FIG. 3, may also be possible.

Preferred dimension of the mesh portion (24) is for example in the case of correct hexagonal mesh, the length of one side of the hexagonal hole formed therein is 6 mm, and in case of rhomboidal mesh, the length of one side of the rhomboidal hole is 6 to 12 mm.

Furthermore when the length of one side of what a mesh of any shape is set to a multiple of 3, as is preferable, length is almost multiple of $\pi$, and it is found that superior efficiency in the action of an electrolysis is obtained.

The alternating electrode plate (21) is comprised of bisymmetrically formed two alternating electrode plates which are assembled to the electrode assemble base plate (23) with a space between each other as on the same surface.

Each of the alternating electrode plates (21) is the same as said ground electrode plate (22) and is formed as a mesh portion (26) and a frame portion (27) formed on a periphery of the meash portion (26). Also, material of the mesh portion (26) is either platinum or platinum plated titanium (plated thickness is more than 3 μm), and material of the frame portion (27) is titanium.

The frame portion (27) is substantially rectangular shape, a mesh plate having the mesh portion (26) is fixed by spot-welding to space area formed on the frame portion (27).

In addition, on the frame portion (27), three penetrate holes are formed in order to let through bolts as fixation means.

Figure 8:
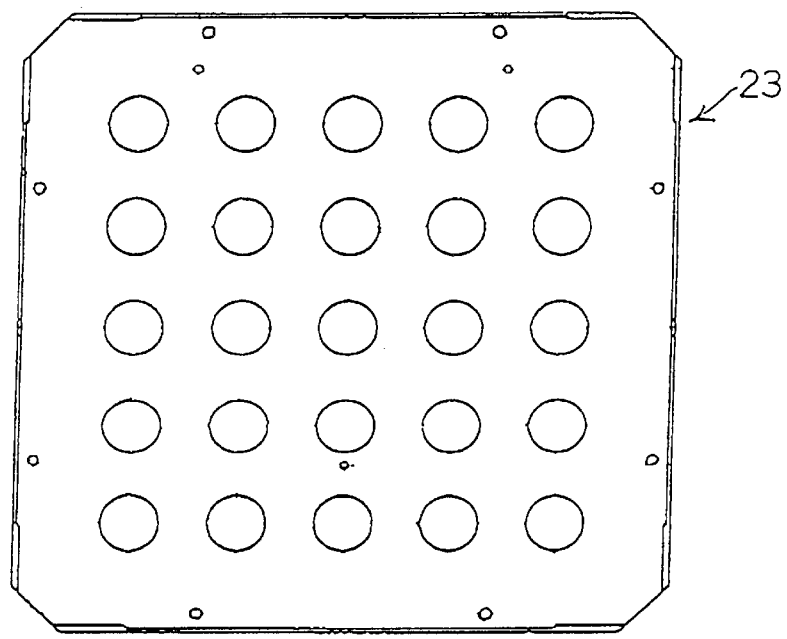
FIG. 8 is a plane view of the electrode assemble base plate.

FIG. 8 is a plane view of the electrode assemble base plate (23).

The electrode assemble base plate (23) is comprised of insulating material such as polyvinyl chloride, whereof many penetrate holes (25 pieces are shown in the figure) are disposed every even space so as to circulate water.

The electrode unit (2) is formed because of the fact that the alternating electrode plates (21), the ground electrode plates (22), and the electrode assemble base plate (23) described above are assembled in one piece by fixation means.

The fixation means is not especially restricted, if the alternating electrode plates, the ground electrode plates, and the electrode assemble base plates are not touching each other, they can be firmly fixed with respect to each other in order to prohibit conduction of electricity, and can be made of a material having superior anti-corrosion characteristics.

Furthermore, in the figure, each electrode plate is fixed by bolts (30) made of SUS and nuts (31) through spacers (28) and adapters (29) both made of synthetic resin.

With use of said electrode plates, in order that the electrolysis efficiency raises to maximum, the interval between opposed electrodes, in the case that water in the water tank (E) is pure water, should set up 5 to 7 mm (preferably 6 mm); in case that the water in the water tank (1) is industrial water, should set up 9 to 15 mm (preferably 12 mm).

Figure 9:
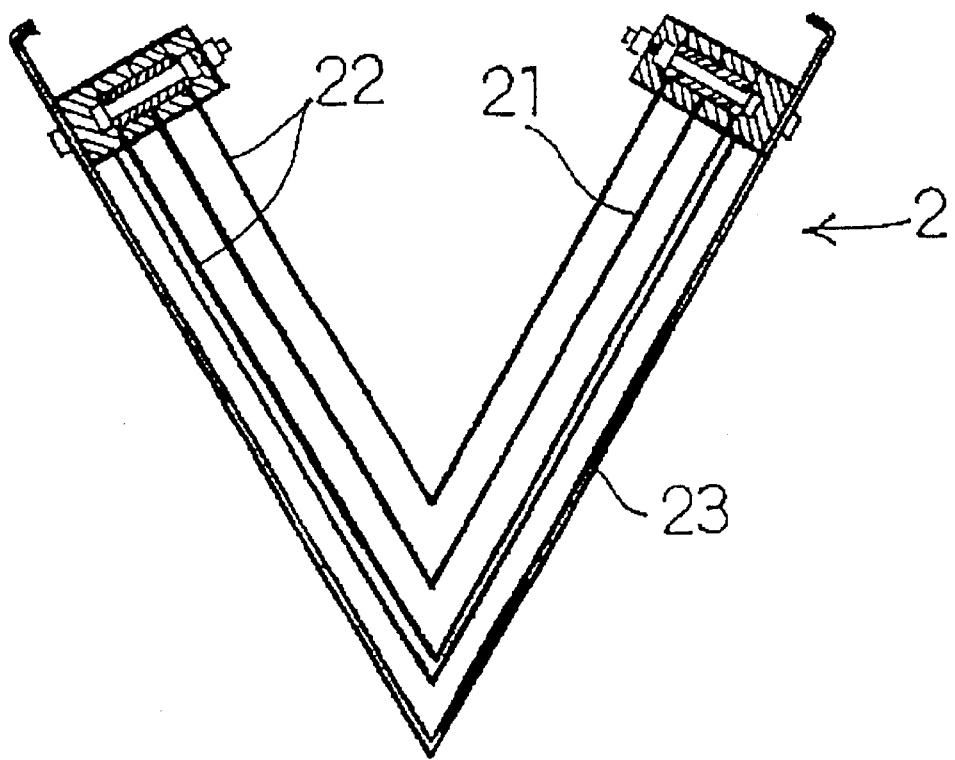
FIG. 9 is a view showing another embodiment of a electrode plate unit.

Furthermore, on this invention, it is possible to adopt the construction whereof the electrode plate unit (2) is formed in a shape substantially like the letter "V" as shown in FIG. 9.

The electrode plate unit (2) as above can be formed by snap-bending at the center line (B—B) put between two sheets of the mesh portion (24), whereof an angle of snap-bending is preferably 60 degrees; however, any angle within 60 to 180 degrees is acceptable.

The electrode plate unit (2) is constructed as described above, the volume can be made small with keeping the surface area of the electrode plate unit (2) itself, therefore the whole of producing apparatus can be made of small size.

The voltage impressing means (not shown in a Figure) arranged outside of the water tank (1) are comprised of a high-frequency alternating voltage generating apparatus, and impressing high-frequency alternating voltage of modulated wave, whereof voltage waveform is mutually opposite phases to the two alternating electrode plates (21).

If impressing alternating voltage of frequency is set up at 30 to 60±5 to 10 kHz and voltage is set up 24V and less, electrolysis efficiency is superior and oxidation-reduction potential of water can be significant lowered quickly, produced reduced water exhibits superior acts removing scale such as in a pipeline, a vessel, a heat exchanger or impurities.

Moreover, on the present invention, reduced water is preferable to be weak acidic (pH 3 to 6) by adding citric acid or nitric acid to produced reduced water. The reduced water can be made weakly acidic by adding citric acid or nitric acid as above so that it can exhibit much superior scale removal action in a shorter time. Furthermore it helps in forming an oxide film on the inside of the pipeline after the scale is removed.

Producing process of reduced water using the reduced water producing apparatus of the present invention will be described hereinafter.

First of all, room temperature water is fed into the water tank (1) from the inlet pipe (4) at the water tank (1); next, high-frequency alternating voltage of modulated wave, whereof voltage waveform is mutually opposite phases, is impressed to the two alternating electrode plates (21) by driving the voltage impressing means.

Then, following reaction always occurs on the ground electrode plates (22);

$$2H^+ + 2e^- \rightarrow H_2 \quad (A)$$

Also, following anode reaction and the reaction of (A) occur alternately on the two alternating electrode plates (21);

$$\text{Pt surface: } H_2O \rightarrow \tfrac{1}{2}O_2 + 2H^+ + 2e^- \quad (B)$$

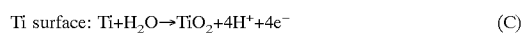

$$\text{Ti surface: } Ti + H_2O \rightarrow TiO_2 + 4H^+ + 4e^- \quad (C)$$

The rate of $H_2$ to $O_2$ which are produced by electrolysis of water is 2:1; however, on the present invention, because of existence of Ti oxidation reaction, the rate of producing of oxygen become less than electrolysis of regular water and an oxygen concentration in water is getting lowered Further, if oxide film generates on Ti surface, the above reaction (C) is hard to react; however, on the apparatus of the present invention, because reactions of (A) and (C) repeat alternately, $H_2$ produced on the reaction (A) destroys $TiO_2$, therefore, the Ti surface is continuously kept in activation. Moreover, the film of $TiO_2$ become thicker in consequence of keeping the electrolysis for a long time, then the reaction (C) is hard to occur, however, the reaction (A) continues since $TiO_2$ is a electric conductor.

Also, on the apparatus of the present invention, because the material of the electrode plates are made of Pt and Ti, electrode material is hard to melt into water, and even pure water can be electrolyzed. In addition, because Pt of the electrode plates is formed in a small area by the mesh portion, the generation of oxygen is restrained and thus the oxygen concentration can be made to be lowered quickly.

With said action, oxidation-reduction potential of water in the water tank (1) is made lowered to −700 to −800 mV quickly, and obtained reduced water can maintain negative oxidation-reduction potential for a long period.

Then, the produced reduced water is taken out from the outlet pipe (3). With the apparatus of the present invention, although current speed of water passing through the electrode plate unit (2) is adjustable within 0 to 60 L/min., current speed of water flowing from the inlet pipe (4) to the outlet pipe (3) is preferable to be set 45 or less L/min. in the case where the capacity of the water tank (1) is around 50 liters.

As described above, with the apparatus of the present invention, it is possible to produce reduced water whereof oxidation-reduction potential is −400 mV or less, and negative oxidation-reduction potential can be maintained for a long period, as a result, high-frequency alternating voltage is impressed to the electrode plates having the surface of titanium and platinum.

Furthermore, two alternating electrode plates in which alternating voltage impressed by the voltage impressing means are varied to be modulated waves of mutually opposite phases, and a ground electrode plate arranged to oppose the two alternating electrode plates are included, therefore water is electrolyzed successively with high-speed, and reduced water of an enormous volume can be produced efficiently.

Further, the electrode plates are made of titanium and platinum, therefore electrode material is hard to melt into water and even pure water can be treated.

Also, by forming the portion of platinum to mesh portion, generating oxygen is restrained and an oxygen concentration can be lowered quickly.

In addition, by forming the mesh portion to rhomboidal or hexagonal shape and/or setting up the frequency of alternating voltage at 30 to 60±5 to 10 kHz, oxidation-reduction potential of water can be significant lowered quickly.

Furthermore, when the water tank is comprised of a pressure-resistant vessel of the circular section shape that can be sealed hermetically on condition that the electrode plate unit is accommodated therein, reduced water of a large volume can be produced safely, and the apparatus is suitable to mass-produce reduced water.

What is claimed is:

1. A reduced water producing apparatus comprising a water tank, at least one electrode plate unit that is arranged within the water tank, and a voltage impressing means for impressing high-frequency alternating voltage to electrode plates comprising the electrode plate unit, wherein the electrode plate unit includes two alternating electrode plates in which alternating voltages impressed by the voltage impressing means are varied to be modulated waves of mutually opposite phases and a ground electrode plate arranged to oppose the two alternating electrode plates, and wherein surfaces of these electrode plates are formed of titanium or platinum, and wherein each of said electrode plates is formed of a mesh portion and a frame portion formed on a periphery of the mesh portion, the mesh portion being formed of platinum or platinum plated titanium, and the frame portion being formed of titanium.

2. The reduced water producing apparatus according to claim 1, wherein said mesh portion is a mesh portion comprised of continuously formed meshes of rhomboidal or hexagonal shape.

3. The reduced water producing apparatus according to claim 2, wherein the electrode plate unit is snap-bent to a substantial V-shape.

4. The reduced water producing apparatus according to claim 1 electrode plate unit is snap-bent to a substantial V-shape.

5. The reduced water producing apparatus according to claim 1, wherein a frequency of alternating voltage impressed by the voltage impressing means is in a range of 30 to 60±5 to 10 kHz.

6. The reduced water producing apparatus according to claim 1, wherein the water tank is comprised of a pressure-resistant vessel of circular section shape that can be sealed hermetically on condition that the electrode plate unit is accommodated therein.

7. The reduced water producing apparatus according to claim 3, wherein a frequency of alternating voltage impressed by the voltage impressing means is in a range of 30 to 60±5 to 10 kHz.

8. The reduced water producing apparatus according to claim 2, wherein the water tank is comprised of a pressure-resistant vessel of circular section shape that can be sealed hermetically on condition that the electrode plate unit is accommodated therein.

* * * * *